J. A. HICKS.
REDUCING VALVE AND MEANS FOR OPERATING SAME.
APPLICATION FILED MAR. 26, 1910.
1,001,401.
Patented Aug. 22, 1911.
2 SHEETS—SHEET 1.
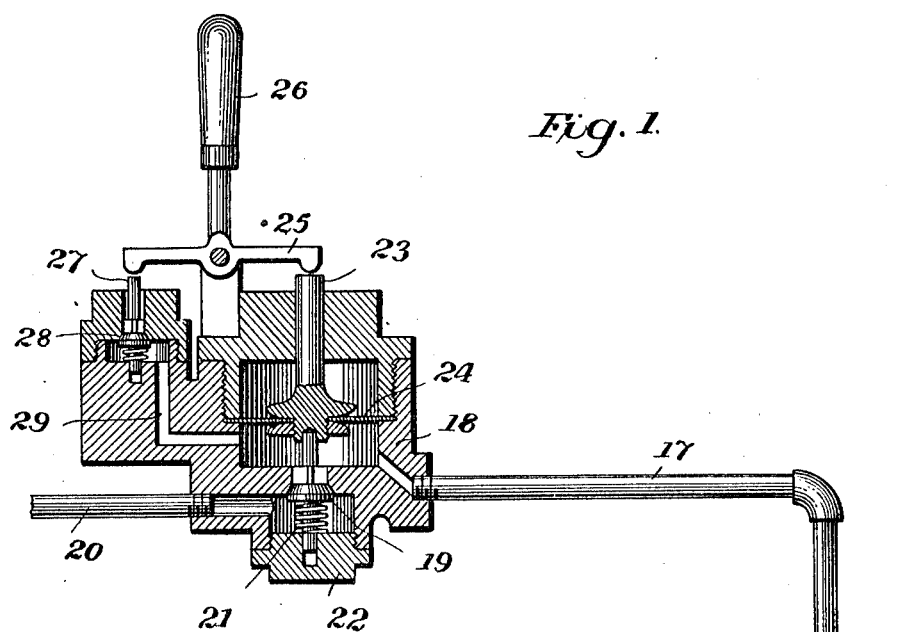
Fig. 1.
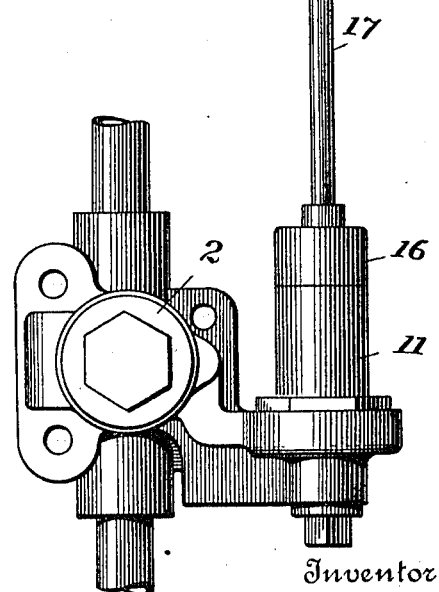
Witnesses
Inventor
James A. Hicks
By G. Howlett Davis
Attorney

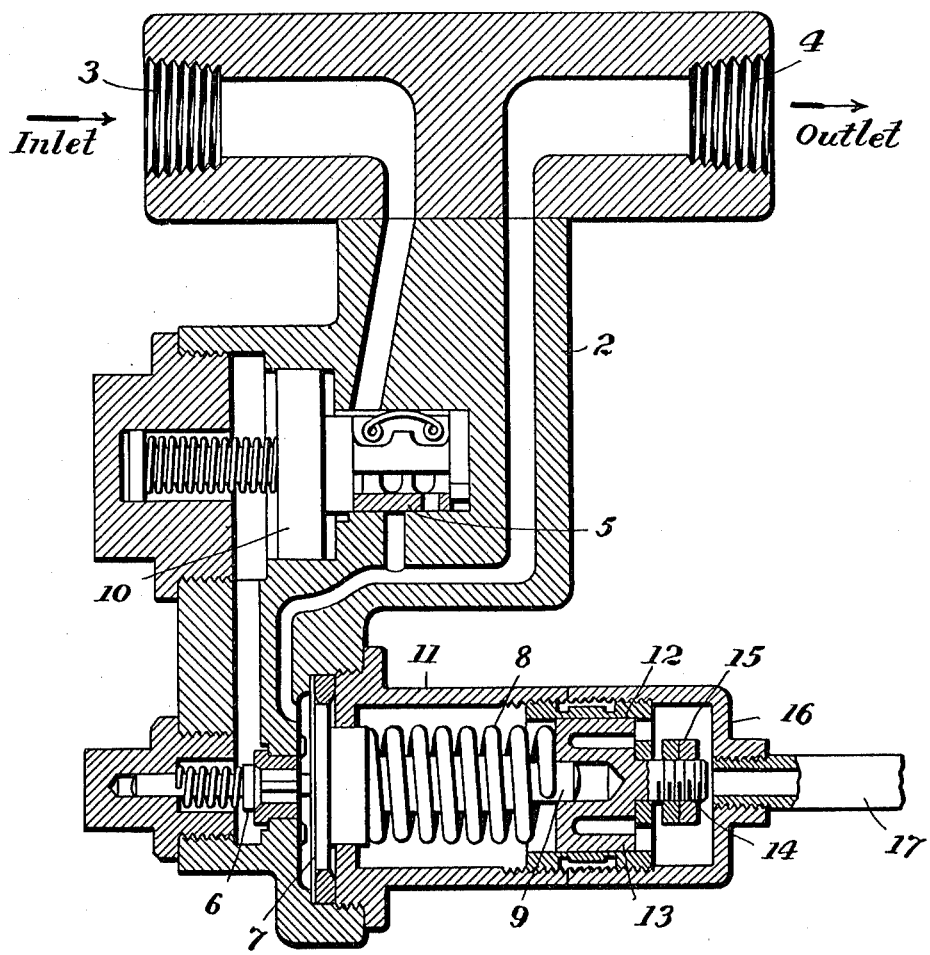

UNITED STATES PATENT OFFICE.

JAMES A. HICKS, OF ATLANTA, GEORGIA.

REDUCING-VALVE AND MEANS FOR OPERATING SAME.

1,001,401.  Specification of Letters Patent. Patented Aug. 22, 1911.

Application filed March 26, 1910. Serial No. 551,765.

*To all whom it may concern:*

Be it known that I, JAMES A. HICKS, a citizen of the United States, residing at Atlanta, in the county of Fulton and State of Georgia, have invented certain new and useful Improvements in Reducing-Valves and Means for Operating the Same, of which the following is a specification.

The present invention relates to reducing valves, or as they are commonly known in the air brake art, "feed-valves", and which are designed to reduce and regulate pressure in a fluid pressure connection such as an air brake pipe.

The present invention has for its object generally to improve valves of this type, and more particularly to provide for varying their action at the will of the operator and at a distance from the valve.

Briefly stated, the invention comprises a feed-valve, which, in the main, is similar to feed valves now in use or which may be of any suitable type capable of reducing pressure in a fluid pressure connection, in which the means for regulating the differential pressures on opposite sides of the valve are capable of being varied by a fluid pressure actuated device such as, for example, a piston, so as to vary or practically intermit the action of the feed-valve when desired, and equalize or nearly equalize the pressure on opposite sides thereof; and, furthermore, this means for varying or intermitting the action of the feed-valve is so arranged as to be capable of operation by a manually operated pressure controlling valve, so that the engine-man or operator can handle the feed-valve to vary or intermit its action from a distance.

In order that the invention may be understood by those skilled in the art to which it belongs, I have illustrated in the accompanying drawings a feed-valve and an operating valve embodying my improvements, and in said drawings: Figure 1 is a diagrammatic view to show the coupling of the feed and control valves, the control valve being in section. Fig. 2 is a sectional view, on a larger scale than Fig. 1, of the feed-valve with my improvements, the view being distorted and diagrammatic in some respects and made without regard to proportions or mechanical relation of parts.

Referring to the drawings by numbers, like numbers indicating like parts in the several views, it will be seen that the feed-valve 2 in many of its general features is similar to feed-valves now in use, having the inlet 3 on the high side of the valve; the outlet 4 on the low side of the valve; the supply valve 5 controlling feed from the high side to the low side; the regulating valve 6; and diaphragm 7, backed by diaphragm spring 8, the usual spindle 9 traversing the spring.

The valve as thus far described, functions in the usual manner, valve 5 being drawn when pressure falls on the low side to admit feeding from the high side, said valve going back and cutting off feed from the high side when the pressure builds up to maximum on the low side against regulating valve diaphragm 7.

The diaphragm spindle and spring are housed within a spring box 11 threaded into the diaphragm receiving chamber, as best shown in Fig. 2. Normally the diaphragm 7 responds to pressure in excess of the pressure of spring 8, and this spring pressure may be varied to meet conditions by compressing the spring 8 more or less, through the medium of the threaded piston cup 12 adjustably mounted in the spring box 11, said cup 12 having apertures through the rear wall thereof and containing a recessed piston 13, the stem 14 of which projects through the head of the cup 12 and has stop nuts 15 which limit the throw of piston 13. Threaded on said cup 12 is a pressure cap 16 which couples with the connection 17, which communicates with a suitable source of pressure which is manually controlled so that it may be thrown into the pressure cap 16 on top of the piston 13, compress the diaphragm spring 8, increase its pressure against the diaphragm 7, and open up the regulating valve regardless of the ratio of pressures on the inlet and outlet sides of the feed-valve, and thus run up the pressure on the low side equal or nearly equal, depending upon the adjustment of the parts, to the pressure on the high side.

It will be observed that in the construction just described the spindle 9 of the diaphragm is supported at its outer end by the piston 13, said spindle entering a suitable bore centrally of the piston; the piston in turn being mounted within the piston cup or cylinder 12 forms the abutment against which the spring 8 bears, and the relatively fixed tension of this spring may be varied by adjusting this piston cup 12 and its contained piston into or out of the spring box 11. The variable tension of the spring 8 is, of course, effected by the movement of the piston 13, which is recessed, as shown, and receives air through apertures in the rear wall of the piston cup 12, said piston moving more or less according to the pressure thrown into the cap 16 and against the piston 12, the extent of movement of this piston and the compression of the spring under its movements being limited by the stop nuts 15 on the piston stem 14, as shown. It will be observed that when the piston 13 is thrown forward by fluid pressure to compress the spring 8, that action of the spring, while practically intermitted by this fluid pressure device, is, nevertheless, a resilient means and does not lose entirely its regulating function. Although its tension has been increased it is nevertheless true that the regulating valve 6 will be capable of operating in its normal manner, although against an increased spring tension.

Normally the connection 17 is closed by a valve device which is best shown in Fig. 1, and comprises a casing 18 provided with a port normally closed by a valve 19 against which pressure from pipe 20 stands, said pipe 20 communicating with any suitable supply; said valve 19 being upheld by a spring 21, a nut 22 being provided to close the bottom of the casing and support said valve and spring. Said valve 19 has a stem which engages the lower end of a diaphragm plunger or rod 23 carried by diaphragm 24 held in a suitable seat in the casing, said rod 23 projecting into operative relation to a double throw lever 26, one arm of which engages the top of rod 23, while the other arm engages the stem 27 of a small release valve 28 controlling a passage 29 from the chamber above the valve 19 to atmosphere. With this arrangement it will be apparent that when the lever handle 26 is thrown to the right, Fig. 1, the rod 23 will be depressed, opening valve 19 and throwing pressure from 20 to connection 17, and thence to the pressure cap 16, moving the piston 13 forward and compressing the spring 8 more or less, dependent on the adjustment of the parts and travel of the piston. The compression of the spring 8 naturally forces the diaphragm 7 against the regulating valve 6 and throws it open, allowing the pressure standing against the piston 10 to reduce through the regulating valve and draw the slide-valve feed-valve 5.

From the foregoing it will be seen that I have provided a feed valve, which, while it possesses all of the features of the ordinary feed-valve, is so constructed that it may be operated to vary the differential pressures and bring the two sides of the valve to equalization, or approximately so, and that this intermitting of the feed-valve reducing action may be accomplished by fluid pressure, from a distance, and through the medium of a valve manually controlled by an operator, as, for example, by the engineer.

While I have disclosed herein the best embodiment of my invention now known to me, since it is obvious that mechanical variations may be adopted without departing from my invention, I do not confine myself to the details of construction except in so far as I am restricted by the terms of the appended claims.

I claim:

1. In a device of the class described and in combination, a supply valve, a regulating valve, resilient means responding to pressure tending to open said regulating valve, adjustable means for giving a relatively fixed tension to said resilient means, fluid-pressure-actuated means controlling the tension of said resilient valve-opening means, and manually-operated means for controlling said fluid-pressure-actuated tensioning means.

2. In a device of the class described and in combination, a supply valve, a regulating valve, resilient means responsive to outlet-pressure tending to open said regulating valve, and fluid-pressure-actuated means for varying the tension of said resilient valve-opening means.

3. In a device of the class described and in combination, a supply valve, a regulating valve, resilient means responsive to pressure tending to open said valve, fluid-pressure-actuated means to vary the tension of said resilient valve-opening means, and means for limiting the travel of said tensioning means.

4. In a device of the class described and in combination, a supply valve, a regulating valve, resilient means responsive to pressure tending to open said valve, fluid-pressure-actuated means to vary the tension of said resilient valve-opening means, and adjustable means for limiting the travel of said tensioning means.

5. In a device of the class described and in combination, a supply valve, a regulating valve, a spring-pressed diaphragm responsive to outlet-pressure tending to open said regulating valve, fluid-pressure-actuated means to vary the tension of the diaphragm spring, and means to limit the movement in both directions of said tensioning means.

6. In a device of the class described and in combination, a supply valve, a regulating valve, a pressure-actuated spring-pressed diaphragm tending to open said regulating valve, a fluid-pressure-actuated piston to vary the tension of the diaphragm spring, and means to limit the movement of said piston in both directions.

7. In a device of the class described and in combination, a supply valve, a regulating valve a pressure-controlled spring-pressed diaphragm tending to open said regulating valve, a fluid-pressure-actuated device to vary the tension on the diaphragm spring, and adjustable means for varying the normal tension of said spring.

8. In a device of the class described and in combination, a supply valve, a regulating valve, a pressure-controlled spring-pressed diaphragm tending to open said regulating valve, a pressure-actuated abutment against which the diaphragm spring bears, and an adjustable support for said abutment.

9. In a device of the class described and in combination, a supply valve, a regulating valve, a pressure-controlled spring-pressed diaphragm tending to open said regulating valve, a fluid-pressure-actuated piston against which the diaphragm spring bears, an adjustable piston cup for said piston, and means for limiting the travel of said piston in said cup.

10. In a device of the class described and in combination, a supply valve, a regulating valve, a spring-pressed diaphragm tending to open said regulating valve and the spindle of which engages a fluid-pressure-actuated piston, an adjustable cupped support in which said piston travels, means for limiting the travel of said piston in said cylinder, and a pressure-cap inclosing said piston and piston support.

11. In a device of the class described and in combination, a supply valve, a regulating valve, a spring-pressed diaphragm tending to open said regulating valve and the spindle of which engages a pressure-actuated piston, an adjustable piston cup in which said piston travels, means for limiting the travel of said piston in its cup, and a pressure-cap secured to said piston cup.

12. In a device of the class described and in combination, a supply valve, a regulating valve, a spring-pressed pressure-opposed diaphragm tending to open said regulating valve, adjustable means for giving a relatively fixed tension to said diaphragm spring, and fluid-pressure-actuated means for increasing the tension on said spring.

13. In a device of the class described and in combination, a supply valve, a regulating valve, a spring-pressed pressure-opposed diaphragm tending to open said regulating valve, adjustable means for giving a relatively fixed tension to said diaphragm spring, fluid-pressure-actuated means for increasing the tension on said spring, and a manually-operated valve-device to control pressure on said actuating means.

14. In a device of the class described and in combination, a supply valve, a regulating valve, a spring-pressed pressure-opposed diaphragm tending to open said regulating valve, adjustable means for giving a relatively fixed tension to said diaphragm spring, fluid-pressure-actuated means for increasing the tension on said spring, and a manually-operated valve-device having inlet and exhaust ports to control pressure on said tensioning means.

15. In a device of the class described and in combination, a supply valve, a regulating valve, a spring-pressed pressure-opposed diaphragm tending to open said regulating valve, adjustable means for giving a relatively fixed tension to said diaphragm spring, fluid-pressure-actuated means for increasing the tension on said spring, and a manual valve-device operable in one direction to apply and in the other direction to exhaust pressure on said spring-tensioning means.

16. In a device of the class described and in combination, a supply valve, a regulating valve, a spring-pressed-pressure-opposed diaphragm tending to open said regulating valve, a spring-box surrounding said diaphragm spring, a piston-cup adjustably mounted on said spring-box, a fluid-pressure-actuated piston in said cup against which said spring bears, a piston-stem projecting through the head of said cup and having an adjustable stop thereon, and a pressure-cap adjustably mounted on said piston-cup.

17. In a device of the class described and in combination, a supply valve, a regulating valve, a pressure-controlled spring-pressed diaphragm tending to open said regulating valve, a spring-box surrounding said diaphragm spring, a piston-cup having an open front and an apertured rear wall threaded to said spring-box, a fluid-pressure-actuated piston in said cup against which said diaphragm spring bears, a piston-stem projecting through the rear wall of said cup, an adjustable stop on said stem, and a pressure-cap threaded to said piston-cup.

In testimony whereof I affix my signature in presence of two witnesses.

JAMES A. HICKS.

Witnesses:
A. V. CUSHMAN,
CHARLES LOWELL HOWARD.